United States Patent
Rys et al.

(10) Patent No.: US 7,487,168 B2
(45) Date of Patent: Feb. 3, 2009

(54) SYSTEM AND METHOD FOR LOADING HIERARCHICAL DATA INTO RELATIONAL DATABASE SYSTEMS

(75) Inventors: Michael Rys, Sammamish, WA (US); Chris Suver, Seattle, WA (US); Bruno Denuit, Bellevue, WA (US); Srinivasa Burugapalli, Sammamish, WA (US); Murray Low, Santa Cruz, CA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 10/001,289

(22) Filed: Nov. 1, 2001

(65) Prior Publication Data

US 2003/0101194 A1    May 29, 2003

(51) Int. Cl.
    *G06F 7/00*    (2006.01)
(52) U.S. Cl. .................. 707/101; 707/100; 709/231
(58) Field of Classification Search ................ 707/100, 707/102, 101, 10, 200–205, 1; 709/201, 709/231
See application file for complete search history.

(56) References Cited

U.S. PATENT DOCUMENTS

| | | | | |
|---|---|---|---|---|
| 5,873,091 A | * | 2/1999 | Garth et al. ................. | 707/102 |
| 6,088,705 A | * | 7/2000 | Lightstone et al. .......... | 707/200 |
| 6,581,062 B1 | * | 6/2003 | Draper et al. ............... | 707/100 |
| 6,631,379 B2 | * | 10/2003 | Cox ........................... | 707/100 |
| 6,665,677 B1 | * | 12/2003 | Wotring et al. .............. | 707/100 |
| 6,732,124 B1 | * | 5/2004 | Koseki et al. ................ | 707/202 |
| 7,031,987 B2 | * | 4/2006 | Mukkamalla et al. ....... | 707/204 |
| 2002/0035574 A1 | * | 3/2002 | Dumas ........................ | 707/200 |
| 2002/0123993 A1 | * | 9/2002 | Chau et al. | |
| 2002/0169788 A1 | * | 11/2002 | Lee et al. | |

OTHER PUBLICATIONS

Carey, M.J., "Of XML and Databases: Where's the Beef?" *Sigmod Record*, International Conference on Management of Data, Dallas, Texas, May 16-18, 2000, 29(2), 576.
Ishikawa, H., et al., "A Decentralized XML Database Approach to Electronic Commerce," *IEICE Trans. Inf. & Syst.*, 2001, E84-D(10), 1302-1312.
Lee, D. et al., "CPI: Constraints-preserving inlining algorithm for mapping XML DTD to relational schema," *Data & Knowledge Engin.*, 2001, 39(1), 3-25.
Yamane, Y. et al., "High-performance XML Storage/Retrieval System," *Fujitsu Sci. & Tech. J.*, 2000, 36(2), 185-192.

* cited by examiner

*Primary Examiner*—Greta L Robinson
(74) *Attorney, Agent, or Firm*—Woodcock Washburn LLP (57) ABSTRACT

Users and programmers can load semi-structured hierarchical data, such as XML data, of arbitrary size and structure into relational database tables using an schema such as an SQL-annotated XML schema. The schema describes how XML data maps into base tables and fields, including complex one-to-many and many-to-many relationships. The hierarchical data is streamed into the relational database tables in a single operation.

17 Claims, 8 Drawing Sheets

SYSTEM AND METHOD FOR LOADING HIERARCHICAL DATA INTO RELATIONAL DATABASE SYSTEMS

FIELD OF THE INVENTION

The present invention relates generally to the field of computing. More particularly, the invention relates to a system and method for importing hierarchical data into relational databases.

BACKGROUND OF THE INVENTION

XML is rapidly becoming the vehicle of choice as a definition language for the description of content-related structures. XML provides great flexibility and universality because XML provides a grammar that can express nearly any content. On the Internet in particular, the standardized representation of content structures generates unexpected opportunities.

More and more, mission-critical applications are designed to run on the Internet. Add the logical structuring capability of XML to the mix, and a new infrastructure that is ideal for running electronic business applications on the Internet becomes much more feasible. Databases can now be accessed directly via XML without having to use CGI and HTML or Java in addition.

Relational databases provide a primary tool for businesses to maintain, access, and analyze data. Such database technologies have evolved over many years so that they are optimized for accessing and manipulating large information bases. Many businesses store the majority of their critical information in 5 relational databases. Moreover, many Internet sites managed their data using relational database technology. This approach also makes it possible to develop database search engines for sifting through the large volumes of information that "live" on the Internet.

The combination of database technology with a self-describing structure of hierarchical languages such as XML opens an interesting perspective for new applications.

The implementation of the kind of tree structures supported by hierarchical languages such as XML in the form of a relational data model presents a number of issues, some of which have already been addressed and 15 solved. One vexing issue is presented when transmitting large amounts of data over the Internet in the form of hierarchical data such as XML. A mechanism that permits large databases to exchange data in the form of hierarchical data structures is desirable.

SUMMARY OF THE INVENTION

The invention provides a mechanism for users and programmers to load semi-structured hierarchical data, such as XML data, of arbitrary size and structure into relational database tables using a schema such as an SQL-annotated XML schema. The schema describes how XML data maps into base tables and fields, including complex one-to-many and many-to-many relationships.

Bulk Load automatically interprets this schema, thus allowing the programmer to insert the XML data into multiple tables in a single operation—a process referred to herein as "shredding". No additional information is required other than to specify the data and the schema which performs the translation. Bulk Load is designed for rapid loading of large amounts of XML data, where performance is paramount.

More particularly, the invention provides systems and methods for moving hierarchical data into at least two relational tables. Such systems and methods comprise receiving a schema describing a relationship of nodes in the hierarchical data to at least one column in each of the at least two relational tables. The schema is used to map the hierarchical data to columns in the relational tables. Records are created from the hierarchical data from nodes identified as data to be stored in the at least one column in each of the at least two relational tables. The records are then streamed into the at least two relational tables.

Preferably, the invention creates a buffer for each of the at least two relational tables in which the records are stored before being streamed into the relational tables. More preferably, the buffer comprises a file.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Figure 1:
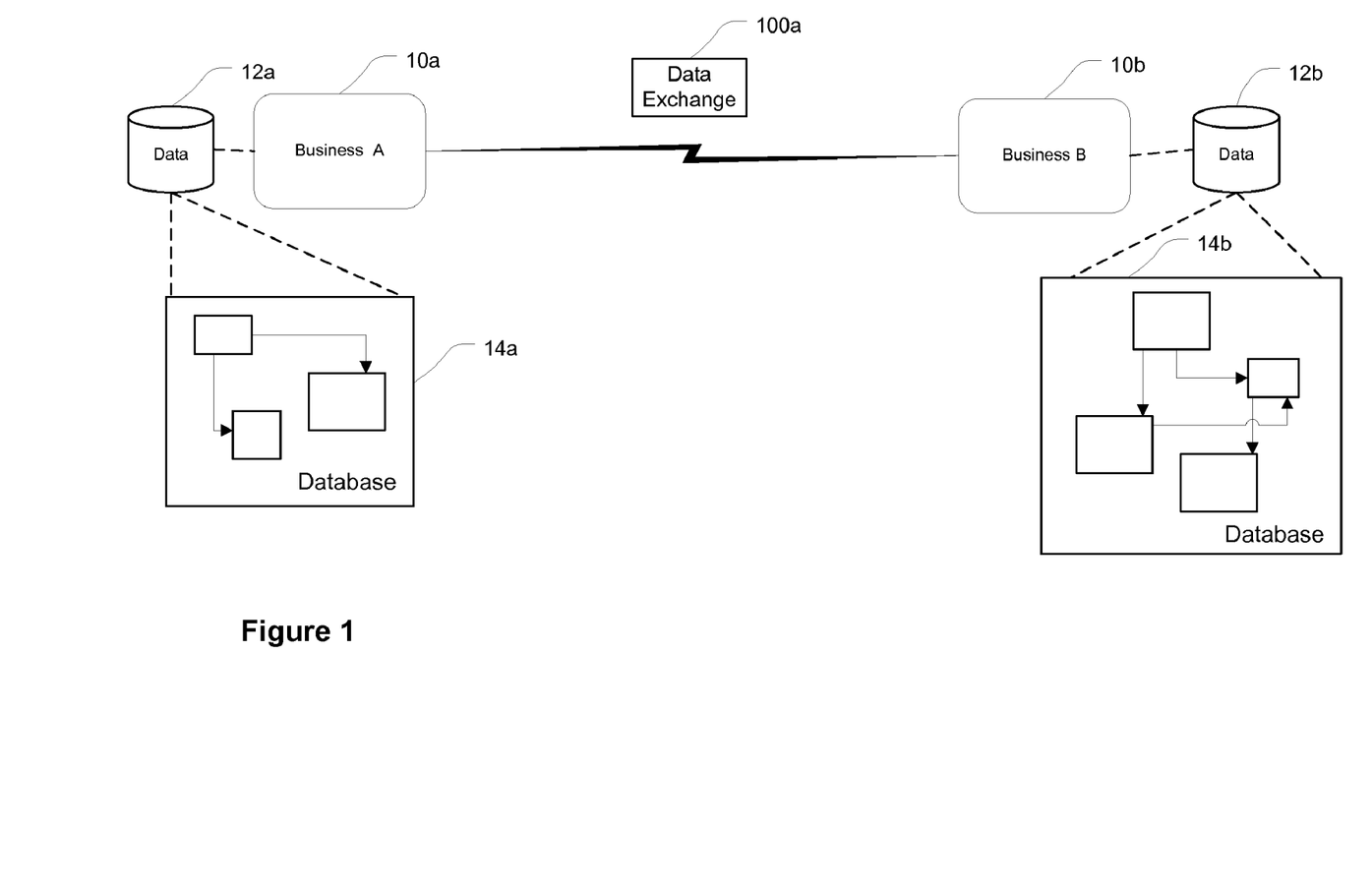
FIG. 1 is a block diagram of an example data exchange illustrating the movement of data between databases.

Electronic communications have fostered the sharing of information among institutions, business, individual, etc. For example, retailers may share sales data with manufacturers, research institutions share research with other institutions and so on. FIG. 1 further illustrates the data sharing among entities. Business A 10a has data 12a comprising a relational database 14a. Business B 10b has data 12b comprising a relational database 14b. The relational databases 14a and 14b are of a proprietary design that is tailored to the individual businesses 10a and 10b. However, the businesses 10a and 10b would like to exchange data 100a. The present invention contemplates that businesses 10a and 10b will exchange data in an XML format, which has been designed for use in transferring data over a computer network. After transferring the data in an XML format from a first database, e.g., database 14a, the data can then be loaded into database 14b by converting the XML into a format appropriate for loading into a relational database.

Illustrative Computer Network Environment

Figure 2:
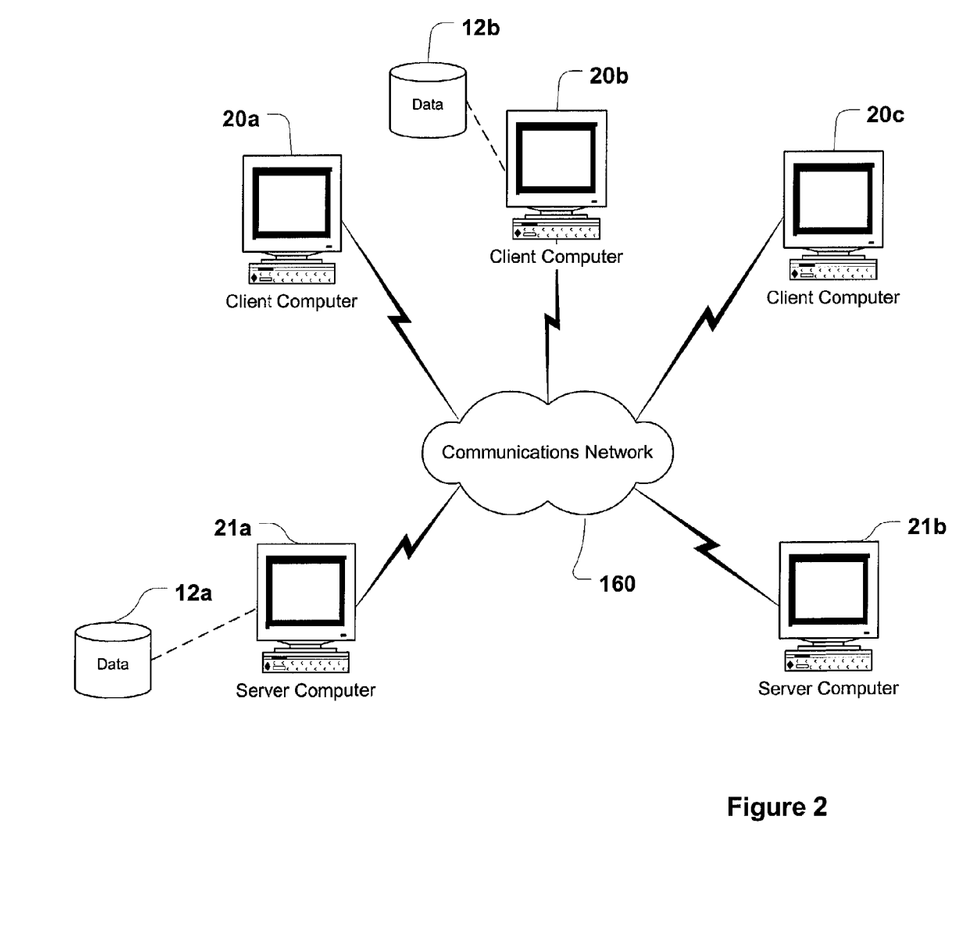
FIG. 2 is an example of a computer network wherein aspects of the present invention may be employed.

FIG. 2 illustrates how the entities, e.g., the businesses 10a, 10b, of FIG. 1 may be configured to communicate in a network environment. Here computers 20a-20c and 21a-21b may host various databases such as databases 14a and 14b of FIG. 1. Although the physical environment shows the connected devices as computers, such illustration is merely exemplary and may comprise various digital devices such as PDAs, network appliances, notebook computers, etc.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 1, computers 20a-20c can be thought of as clients and computers 21a, 21b can be thought of as servers where server 21a maintains the data that is then exported for use by the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a, Uniform Resource Locator (URL) or an Internet Protocol (IP) address is used to identify the server or client computers to each other. The network address can be referred to as Uniform Resource Locator address. For example, communication can be provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). FIG. 2 illustrates an exemplary network environment, with server computers in communication with client computers via a network, in which the present invention may be employed. As shown in FIG. 2, a number of servers 21a, 21b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the present invention can be implemented with a variety of network-based architectures, and thus should not be limited to the example shown. The present invention will now be described in more detail with reference to an illustrative implementation.

XML Data Transfer

Figure 3:
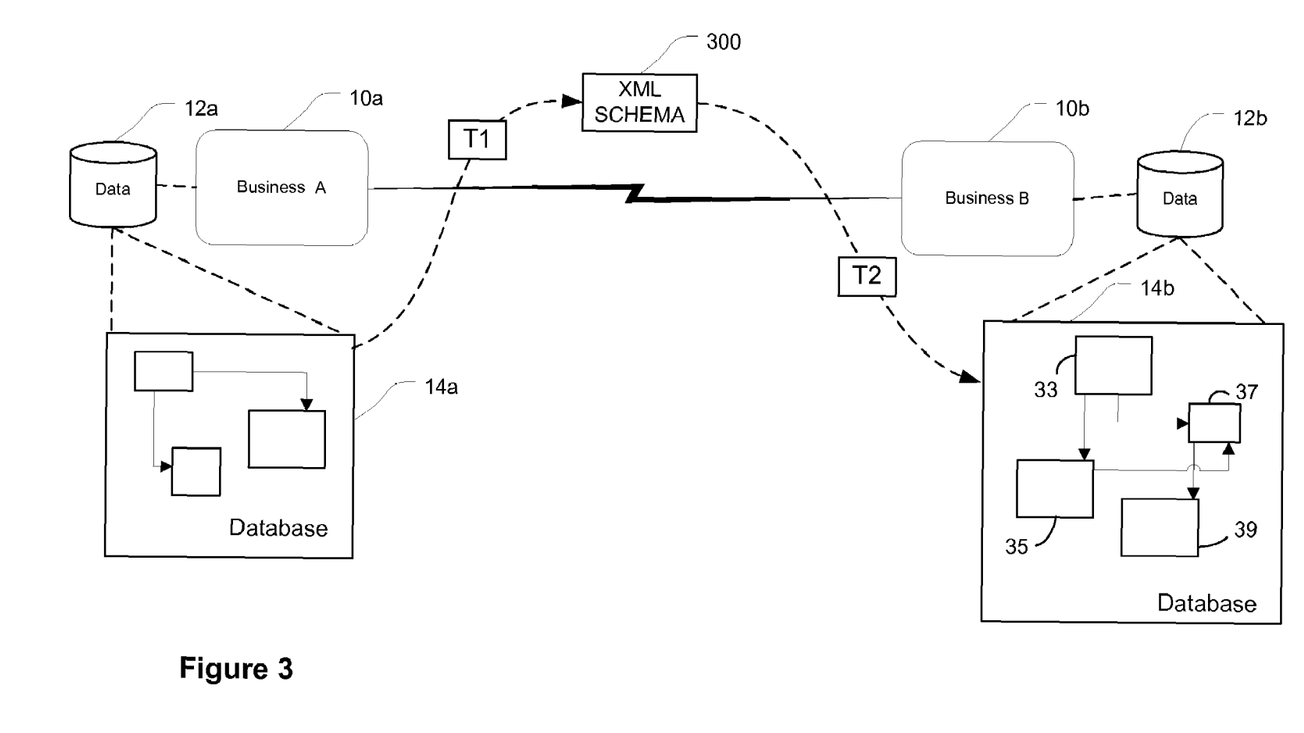
FIG. 3 is a block diagram illustrating the data exchange between database by way of a hierarchical description language.

According to an aspect of the invention, data is exported, e.g., from Business A 10a, by way of a hierarchical self-describing format such as extensible markup language (XML). FIG. 3 further illustrates this aspect of the invention. Here, Business A 10a transformed its proprietary relational data into XML and has defined the data by way of an XML schema 300. Business A 10a uses transform T1 to extract and convert the data stored in its own proprietary database 21a to an intermediary XML format described by XML schema 300. Thereafter, Business B 10b can use the XML schema to map the data from the XML into the proper tables (e.g., 33, 35, 37, and 39). Business 10b uses transform T2 to extract data using XML schema 300 into its proprietary database 21b.

The transformation of transform T1 to create XML views of the relational data of database 21a can be created using, for example, XDR (XML-Data Reduced) schemas. These views can then be queried using XPath queries. This is similar to creating views using CREATE VIEW statements and specifying SQL queries against the view. An XML schema describes the structure of an XML document and also various constraints on the data in the document. When you specify XPath queries against the schema, the structure of the XML document returned is determined by the schema against which the XPath query is executed.

In an XDR schema, the <Schema> element encloses the entire schema. As properties of the <Schema> element, you can describe attributes that define the schema name and the namespaces in which the schema reside. In the XDR language, all element declarations must be contained within the <Schema> element. The minimum XDR schema is:

<?xml version="1.0" ?>
<Schema xmlns="urn:schemas-microsoft-com:xml-data">
. . .
</Schema>

Here, the <Schema> element is derived from the xml-data namespace (urn:schemas-microsoft-com:xml-data).

Figure 4:
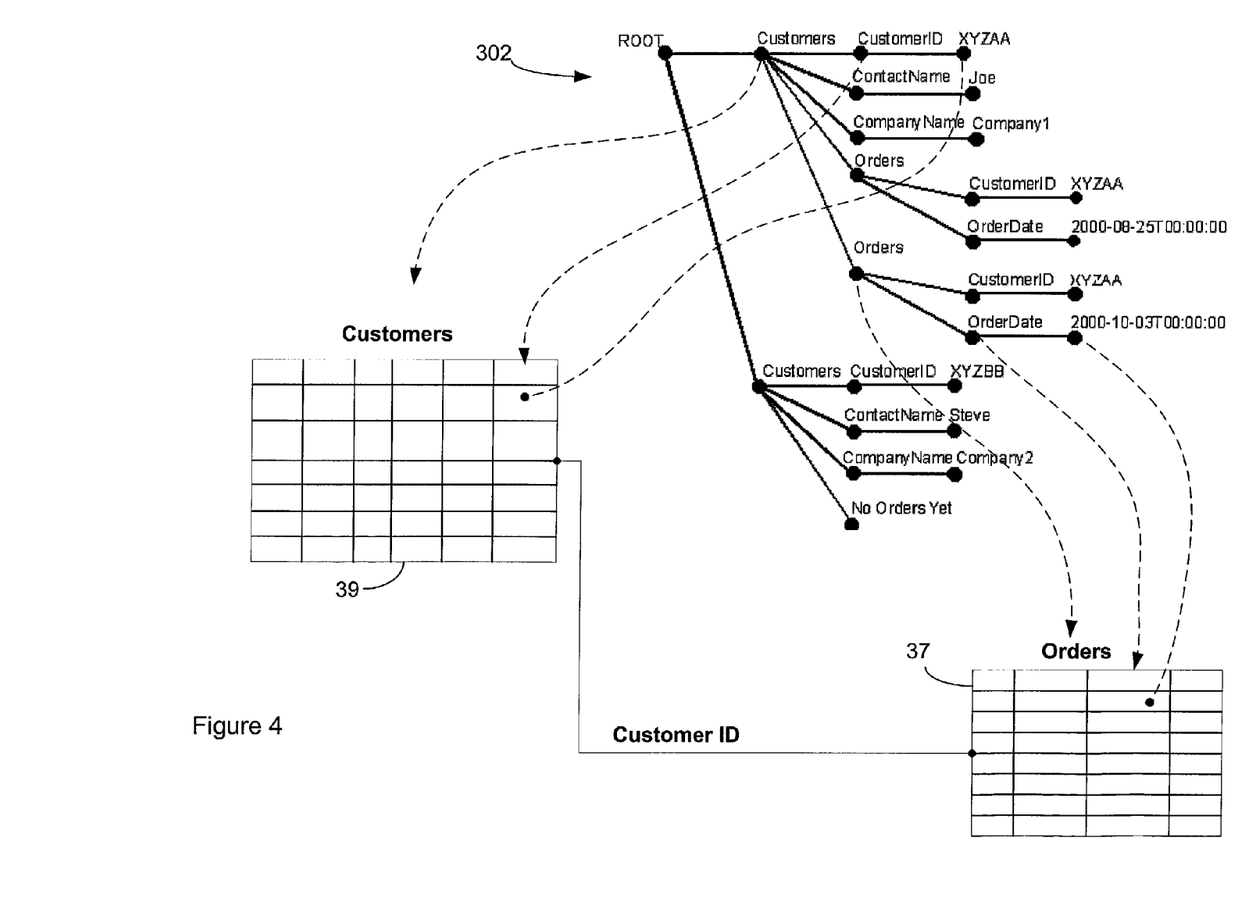
FIG. 4 is an illustration of the mapping of hierarchical data into a relational table.

FIG. 4 illustrates the hierarchical mapping of an XML schema to relational tables. In this example, tables 39 and 37 represent "Customers" and "Orders" tables respectively that are stored in database 21b (see also FIG. 3). As shown, the nodes labeled "Customers" implicate Customers table 39 and nodes labeled "Orders" implicate Orders table 37. The child nodes of cutomer could be either columns within the Customers table 39 or may represent data stored in a table related to Customers table 39. For example, nodes labeled CustomerID implicate a column in the Customers table 39, whereas nodes labeled Orders implicate Orders table 37. Child nodes of table column names represent row information to be stored in the column. For example, node labeled "XYZAA" represents data for the CustomerID column of Customers table 39.

Nodes at the same level in the hierarchy such as CustomerID, ContactName, CompanyName all represent columns within the same table, e.g., table 39, or represent a table having a relation to the table. An example of a relation is Orders table 37, which is related to Customers table 39 by way of the CustomerID key. Notice, for example, that the CustomerID node child of the Orders node has the same identifier as the CustomerID child of Customers. This indicates that the nodes are mapped to two different tables with a key relation CustomerID.

Such a hierarchical structure might be represented by the following XML schema fragment:

```
<XSD: element name = "Customer"
    SQL:relation = "Customer">
    <XSD:complex type>
        <XSD:sequence>
            <XSD:element name = "CustomerID"
                SQL: Field = "CustomerID"/>
        </XSD:Sequence>
        <XSD:Attribute name = "ContactName"
            SQL:Field = "ContactName"/>
    <XSD:complex type>
    ...
```

A corresponding XML document would then contain the following:
    <Customer ContactName="Joe">
      <CustomerID> "XYZAA"</CustomerID>
    </Customers>

In general, all element and attribute data which is contained in the body of an XML document is consumed and mapped to corresponding tables and columns and stored in the underlying SQL database.

The "shredding" process described above is an important aspect of the invention. This is the process by which XML input data is broken into records for multiple tables. The shredding process figures out when to generate a new record, how to fill in the fields for that record based on the XML data it sees, and determines when the record is "completed" so that it may be handed off to the server for insertion. The invention resolves the schema definition and the actual data stream to produce an actual set of records.

Bulk Loading

Figure 5:
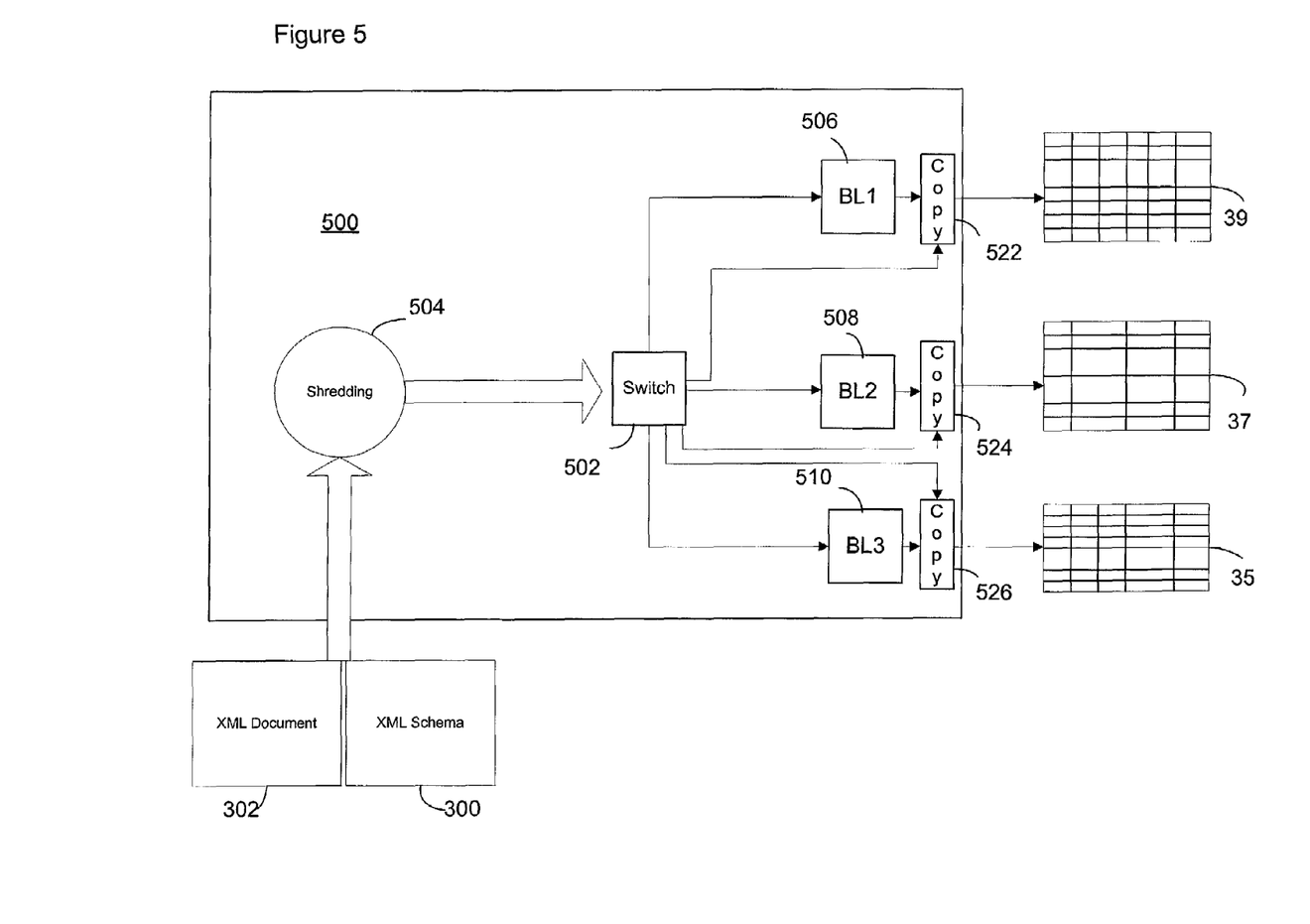
FIG. 5 illustrates the bulk loading of hierarchical data into relational tables in accordance with an aspect of the invention.

According to an aspect of the invention, hierarchical data such as XML is bulk loaded into a relational database. The process sets up buffers for each of the SQL tables in the database and with a relational database instruction, or with a COM object using a Bulk Load Class automatically loads the contents of the document into the relational tables. For example, the following sample illustrates the simplicity of the code to perform a bulk load:
    set objBL=CreateObject("SQLXMLBulkLoad.SQLXMLBulkLoad")
    objBL.ConnectionString=
    "provider=SQLOLEDB;uid=sa;pwd=;database=pubs"
    objBL.ErrorLogFile="c:\error.log"
    objBL.Execute "c:\SampleSchema.xml", "c:\SampleData.xml"
    set objBL=Nothing FIG. 5 illustrates the flow of an XML document 302 and a corresponding XML schema being shred by shredding process 504. As XML document 302 is shred, records for various tables are sorted into buffers associated with each table, e.g., buffer BL1 506 is associated with table 39, buffer BL2 508 is associated with table 37, and buffer BL3 510 is associated with table 35. Switch 502 determines which buffers, e.g., 506, 508, 510, get which records, and also controls when the records are written from various ones of the buffers, e.g., 506, 508, 510, into the associated tables, e.g., 39, 37, 35, respectively.

Bulk Load accomplishes the shredding process "in situ", that is, it must interpret the hierarchical data, e.g., XML data, determine the destination SQL target fields and tables, and pass the resultant records to the server—all as it is encountering the XML data in the input stream. This is contrast to other XML to SQL insertion mechanisms such as Updategrams, which can load the entire sql:before and sql:after images of the data into memory, run an analysis on it to determine the affected records, then issue a sequence of SQL statements to effect the change. In order to work similar to Updategrams, Bulk Load would have to load the XML file and create the in-memory DOM for the data set. This is expensive for data sets involving thousands, or perhaps even millions, of records.

In-situ operation implies the Bulk Load will generate records on an unordered basis. Such a process may have two records ready for a first table, e.g., table 39, then a few records for a second table, e.g., table 37, followed by more records for the first table again. It is desired that these records be passed to SQL server for insertion in parallel; that is, each record is immediately sent to the server as soon as the assembly process for that record is completed. This is in contrast to a serial approach, where all records for a table are batched up and inserted all at once before attempting an insert on the next table.

Serialization implies one of two solutions: buffering or passing through the data multiple times. Both are present issues from a performance point of view, and hence again point to the preferred method of in-situ, parallel operation.

Records are preferably written to a temporary files, one per table, then T-SQL BULK INSERT is used for each table. That is, buffers 506, 508, and 510 are preferably temporary files as opposed to memory.

Bulk Load preferably does not buffer large numbers of records while waiting for various fields to be filled in before sending them off to SQL server. Again, due to the large number of records potentially involved, this buffering would consume undesirably large amounts of memory during execution. An example of this is a customers/orders schema in element-centric normative form, where there is a one-to-many relationship between customers and orders joined by CustomerID. It is possible that the data stream contains 100, 000 detail order records for a given customer, before the specific CustomerID is encountered in the data stream. It is undesirable to buffer these 100,000 records in memory while waiting for the last field.

There are at least two options to address this buffering issue: (1) require the user to specify the ID field first, or (2) perform upserts—that is, insert the record immediately and then when the CustomerID field is encountered, do an update operation. The former is preferable, as doing the latter again would degrade performance.

Unlike a single SQL table, XML data is interrelated, with one-to-many and many-to-many relationships between mapped XML data, so to support simple numerical batching might break referential integrity in the face of violations and errors. Accordingly, partial commits for XML Data would likely not be preferred. This is divergent from other SQL bulk insert methodologies which support a "rows-per-batch" or "KB per batch" concept.

Shredding is complicated by the fact that present invention contemplates the ability to handle arbitrarily large sets of data. To that end, the schema, e.g., schema 300, is first analyzed to build an execution plan, which is subsequently applied as data is encountered in the input stream. There are a variety of common schema formats with which the invention operates, including attribute-centric normative mappings (ACNM), element-centric normative mappings (ECNM), default schema mappings, containment, and one-to-many and many-to-many relationships with proper referential integrity.

Exemplary Shredding Algorithm

In XML, the Document Object Model (DOM) presents documents as a hierarchy of node objects that also implement other, more specialized interfaces. Some types of nodes may have child nodes of various types, and others are leaf nodes that cannot have anything below them in the document structure. Nodes include document interface, elements, and attribute nodes. For the most part, the difference between an element and an attribute is not important for the purposes of formulating and running against an execution plan.

A node is considered to "enter scope" when it is encountered in the data stream. For elements, this is the start tag; for attributes, this is the attribute name. A node leaves scope when there is no more data for it. For elements, this is the end tag; for attributes, this is when the attribute value is finished. Scopes nest in the obvious way following XML containment. It's like the parser building the DOM tree as it walks the XML data, except the node is deleted once it leaves scope. Every node along the current tree path to the current leaf has a scope associated with it.

Each time a node enters scope there is a potential for generating a new record. Should one be generated, that record will live as long as the node associated with it is in scope. Once that node exits scope, the record is considered to be complete, and sent to SQL server. This is referred to herein as the record lifetime rule.

The record lifetime rule fits in nicely with the buffering limitations mentioned earlier; there is a guaranteed, predictable lifetime for how long a record will live. It will not hang around forever waiting for fields in it to be filled in. In all but the most degenerate cases, there should be little or no long-term buffering, e.g., in buffers 506, 508, 510, as a result. The downside of this technique is that is forces the user to insure that all data associated with a record be defined within the scope of some node.

Basic Record Generation Rules

There are two cases in which a new record is generated when a node is encountered during shredding:
1. None of the parent scopes have generated a record for the sql:relation defined for this node.
2. An sql:relationship exists for this node, subject to certain exceptions (applicable to IDREF(S) only).

The first rule (1) handles the usual flat, ACNM, ECNM and default schema mappings. As an example, take the following:

```
<?xml version="1.0" ?>
<Schema xmlns="schemas-microsoft-com:xml-data">
    <ElementType name="Customers" sql:relation="Customers">
        <!-- attribute declarations for columns-->
        <AttributeType name="CustomerID" />
```

-continued

```
        <AttributeType name="CompanyName" />
        <AttributeType name="ContactName" />
        <AttributeType name="ContactTitle" />
        <AttributeType name="Address" />
        <AttributeType name="City" />
        <!-- declare the instances -->
        <attribute type="CustomerID" />
        <attribute type="CompanyName" />
        <attribute type="ContactName" />
        <attribute type="ContactTitle" />
        <attribute type="Address" />
        <attribute type="City" />
    </ElementType>
</Schema>
```

When the Customer tag is encountered, a new record is started for the Customers relation. Each attribute encountered also has its sql:relation set to Customers (since it is not redefined); because a parent scope has generated a Customer record already, a new record is not generated—attribute values are simply placed into the appropriate fields of the parent record.

An sql:relationship implies a one-to-many mapping between some parent scope and the scope where it is defined, and hence a new record is generated in this case for the foreign relation. This is true even if the parent scope and the node's scope are on the same relation, to support "Employee-works-for" scenarios. One-to-many support is implemented by taking the value specified in the (relation, field) attributes and placing it into the newly generated record—specifically into the field defined by (foreign-relation, foreign-key) attributes.

Subsets simply refer to the set of records which are generated on the "many side" of a one-to-many relationship. All of the records generated by an sql:relationship that share a common parent (as is the case with normal containment) are tied together in the same subset. The distinguishing characteristic of this subset is that the present invention contemplates that foreign-key fields for the records are automatically filled in on behalf of the primary key even though it has only been encountered once in the data stream.

When the parent of a subset goes out of scope, the subset is released, i.e. written to the proper SQL table from the buffer. This also puts a predictable life span on the caching needed for a subset (which is minimal), again to satisfy buffering limitations. This is referred to herein as the subset lifetime rule.

If, at the time the records in the subset are generated, the key value tying the primary-foreign relationship together have not been encounter, a potentially unlimited number of records could need to be processed, requiring an unlimited buffer while waiting for the key value. Consider the example of customers and orders:

```
<Customer>
    <Name>John Worley</Name>
    <Title>Trumpet Player</Title>
    <Orders OrderID="1" ShipDate="3/4/99" /> </Orders>
        . . . a million more order records . . .
    <CustomerID>34</CustomerID>
</Customer>
```

In this case the million order records would need to be buffered until the CustomerID was encounter so that it could be placed in all the records. This is not a good solution.

Accordingly, the user should place the CustomerID field before the <Orders>. This rule is referred to herein as the key ordering rule.

It may be the case that when bulk loading data, that data is loaded into tables with identity fields. In addition, it may be the case that those identity fields serve as a parent key for one or more other tables. In this case, when a new ID is generated for a row inserted in the parent table that ID may have to be propagated to one or more child tables. To that end, bulk load ID propagation is introduced. When generating the new ID's, we must take care not to lose any data in converting over from the old ID's in the data.

Figure 6A:
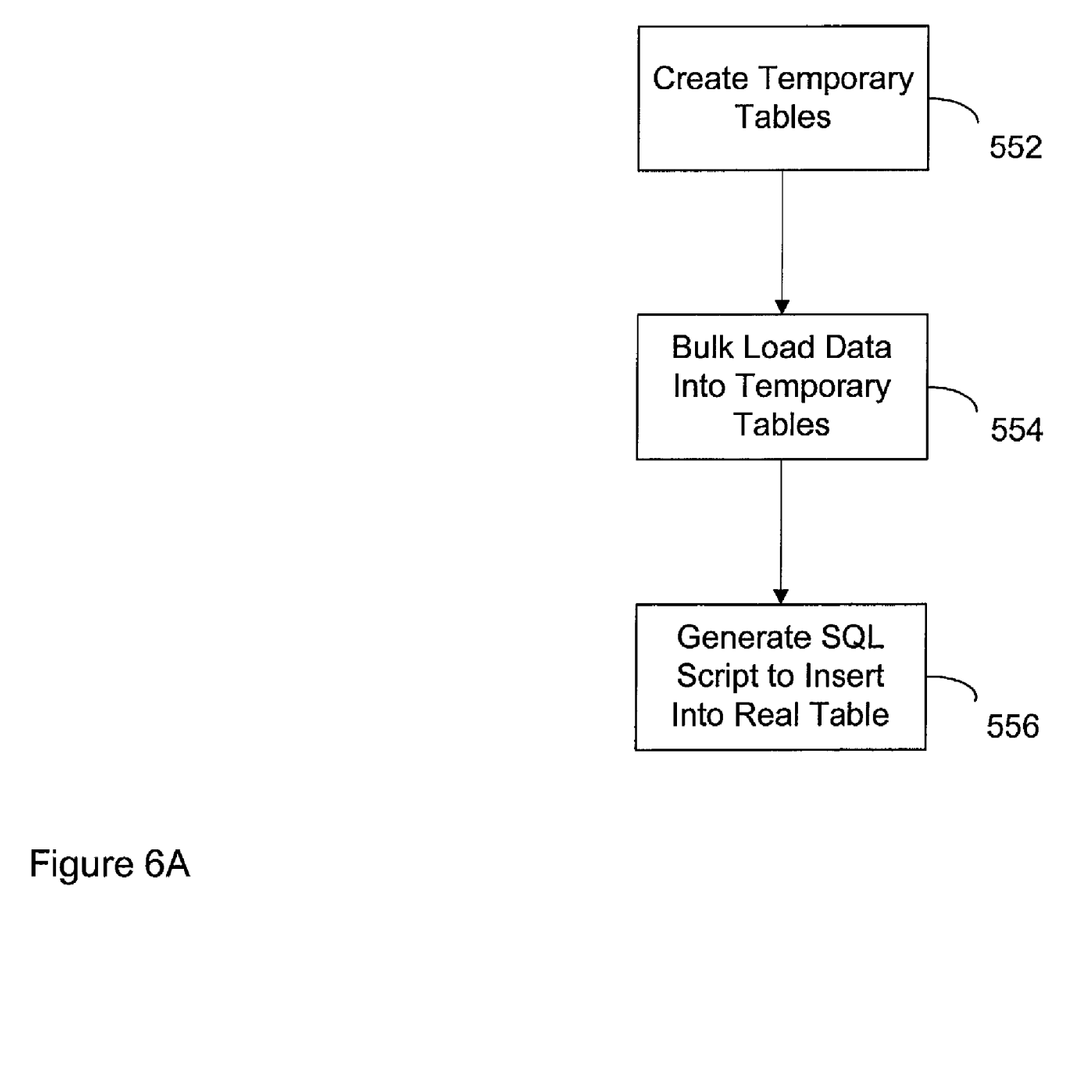
FIG. 6A is a flow chart illustrating further aspects of the bulk loading of FIG. 5.

There are three basic steps to bulk loading data with ID propagation. Those steps are outlined below in conjunction with FIG. 6A:

1. Create temporary tables (552). These tables will be used to hold the original information before it is transferred to the actual tables. In this way, all work can be done on the server which should be much better performance-wise than trying to generate and propagate ID's on the fly and sending data between the database server and the middle tier.
2. Bulk load data into temporary tables (554). All of the data in its original form will be bulk loaded into the temporary tables created in step one. Once there it can be transferred into the actual tables with scripts.
3. Generate a SQL script to insert the rows one by one from the temp table to the real table and to get the generated identity and propagate it to the children (556). This is where the actual transfer of information occurs. Once the data is in temporary tables in it's original form, scripts will transfer it over to the actual tables, generating new IDs. The scripts will then update any children with the new ID's.

There are several different "types" of relationships which need to be considered when performing ID propagation:

"Parent Tables"—Those tables who are not children. They do not have any foreign key relationships in which they are not the parent table. These tables can be safely inserted without having to be propagated to. (Note: This is Parent Tables with capital "P". This is different from "parent tables", and table which is the parent in a foreign key relationship. Parent tables have no "parent tables", while "parent tables" may or may not have them.)

"One-parent Children"—Those tables who have a foreign key relationship with exactly one other table. They are the child in this relationship. These tables have to be propagated to, but only have to wait for their one parent table. As soon as the appropriate data is entered in their parent table, ID's can be propagated and their data may be filled in.

"Multi-parent Children"—Those tables who have a foreign key relationship with more than one other table. They are the child in this relationship. These tables have to be propagated to, but have to wait for several parent tables to be generated. Once all of their parents have been created and data has been filled in, they may be propagated to.

"Circular Relationships"—Two or more tables which have foreign keys in such a matter that a "circle" is formed following paths between them. Dealing with circular relationships is described more fully herein below.

To ensure that all data is entered correctly and that all ID's are propagated correctly, data is preferably transferred from the temporary tables to the actual tables in a specific order. First, all "Parent Tables" are transferred because ID's do not have to be propagated to them. Once transferred, new identity fields can be generated, and that information can be propagated to any child tables. For the remaining tables, those tables in a "One-parent" or "Multi-parent" relationship, a queue will be created to hold them until their time to be entered.

Figure 6B:
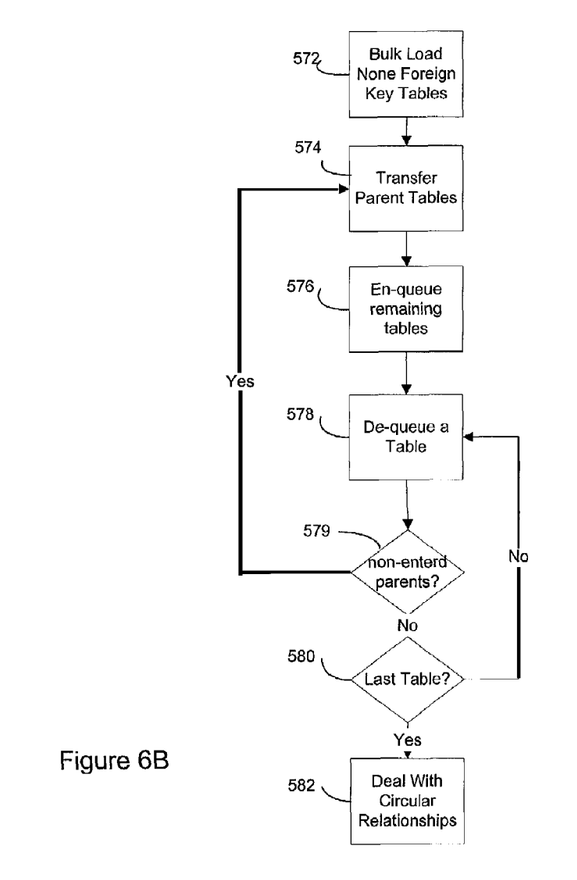
FIG. 6B is a flow chart illustrating further aspects of the bulk loading of FIG. 5.

To deal with the various relationship types, data entry and propagation will occur as described in below in conjunction with the flow chart of FIG. 6B:

1. All tables not in a foreign key relationship will be bulk-loaded directly into their destination tables (572). No propagation needs to occur, so temporary tables are useless.
2. All Parent tables' data will be transferred and ID's will be propagated to their children, if any (574).
3. En-queue all remaining tables that are NOT in a circular relationship with one or more other tables into a queue (576).
4. De-queue a table (578). If all of that table's parents have already been transferred, then that table's data will be transferred to the actual table with the new values from its parents. It will then generate any new identity values, if it has an identity column, and propagate that information to its children, if any. If that table has one or more parents that have not yet been entered, that table is again en-queued, and step 2 is repeated (579).
5. Repeat until the queue is empty (580).
6. Deal with tables in a Circular Relationship (582).

There are two different cases wherein there are tables with circular relationships. In one, data is being propagated to a field which is not part of a table's key. In this case, each table in the circular relationship could be transferred to the actual table EXCEPT for the fields that are going to be propagated to. Once all tables have been transferred and new identities generated, the fields can be propagated to.

The other situation though involves circular relationships in which data is propagated to a key or part of a key. An easy way to deal with this would be to turn off the keys, do what is stated in the above paragraph to propagate ID's, and then turn the keys back on. But this may not be the best solution For example, consider the following:

TABLE 1

Id1, pk, ident
Id2, pk

TABLE 2

Id1, pk
Id2, pk, ident

Define 2 foreign keys:

| Parent | Child |
| --- | --- |
| Table 1 - Id1, Id2 | Table 2, Id1, Id2 |
| Table 2, Id1, Id2 | Table 1 - Id1, Id2 |

This is legal to do in SQL Server with UPDATE and DELETE cascading turned off, but may not be likely that a user would want to do this.

Figure 7:
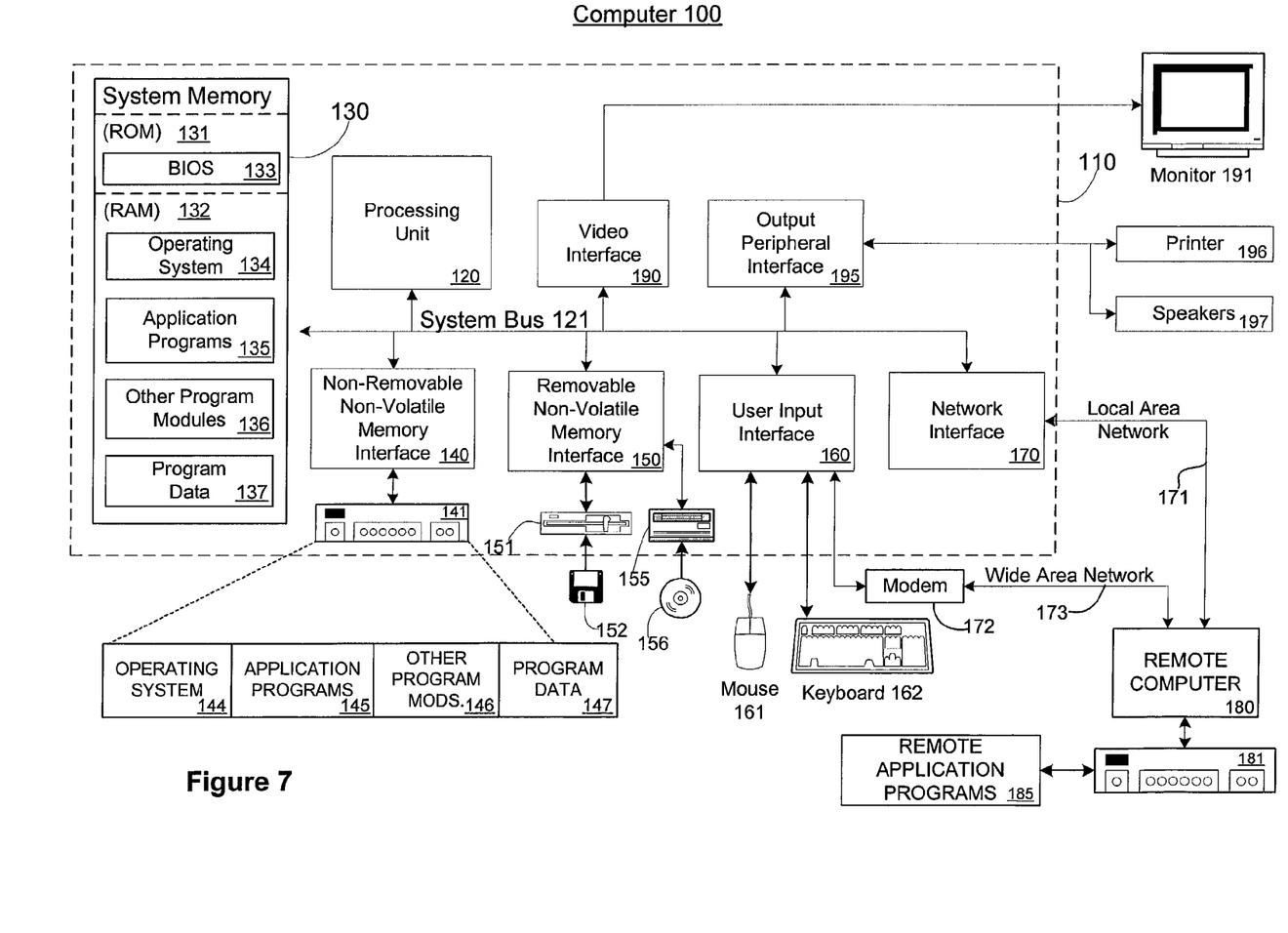
FIG. 7 is a block diagram of an exemplary computing environment in which aspects of the invention may be implemented.

With reference to FIG. 7, an exemplary system for implementing the invention includes a general purpose computing device in the form of a computer 110 that could form a portion of client computer 20a-20c or server computers 21a, 21b (see FIG. 1). Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

Computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, DVD players, VCRs, home appliances, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for loading data organized in a hierarchical arrangement into at least two different relational tables, comprising:

receiving a schema describing a relationship of nodes in the data organized in a hierarchical arrangement to at least one column in each of the at least two different relational tables;

mapping the data organized in a hierarchical arrangement to the at least one column in each of the at least two different relational tables based on the schema and creating in at least two different files where each file is associated with one of at least two different relational tables records from the data organized in a hierarchical arrangement from nodes identified as data to be stored in the at least one column in each of the at least two different relational tables; and streaming the records into the at least two different relational tables by inserting the records from the at least two different files into corresponding ones of the at least two different relational tables as each record is determined to be complete.

2. The method as recited in claim 1 further comprising creating a buffer for each of the at least two relational tables wherein the records are stored before being streamed into the at least two different relational tables.

3. The method as recited in claim 1 wherein the data organized in a hierarchical arrangement is not size constrained.

4. The method as recited in claim 1 wherein the data organized in a hierarchical arrangement comprises an XML document.

5. The method as recited in claim 1 wherein the schema comprises an XML schema.

6. The method as recited in claim 1 wherein the at least two different tables have a relational relationship.

7. The method as recited in claim 6 wherein one of the at least one columns is a key field in one of the at least two different tables and foreign key in the other one of the at least two different tables, wherein the method further comprises populating records associated with the at least two different tables with the data associates with the one of the at least one columns.

8. The method as recited in claim 1 further comprising streaming the record into the at least two different relational tables substantially in parallel.

9. The method as recited in claim 1 wherein the schema is received by way of a network connection.

10. A system for loading data organized in a hierarchical arrangement into at least two different relational tables, comprising:

instructions for receiving a schema describing a relationship of nodes in the data organized in a hierarchical arrangement to at least one column in each of the at least two different relational tables;

instructions for mapping the data organized in a hierarchical arrangement to the at least one column in each of the at least two different relational tables based on the schema and creating at least two different files where each file is associated with one of at least two different relational tables records from the data organized in a hierarchical arrangement from nodes associated identified as data to be stored in the at least one column in each of the at least two different relational tables; and instructions for streaming the records into the at least two different relational tables by inserting the records from the at least two different files into corresponding ones of the at least two different relational tables as each record is determined to be complete.

11. The system as recited in claim 10 further comprising instructions for creating a buffer for each of the at least two different relational tables wherein the records are stored before being streamed into the at least two different relational tables.

12. The system as recited in claim 11 wherein the buffer comprises a file.

13. The system as recited in claim 10 wherein the data organized in a hierarchical arrangement comprises an XML document.

14. The system as recited in claim 10 wherein the schema comprises an XML schema.

15. The system as recited in claim 10 wherein the at least two tables have a relational relationship.

16. The system as recited in claim 10 wherein one of the at least one columns is a key field in one of the at least two tables and foreign key in the other one of the at least two tables, wherein the system further comprises instructions for populating records associated with the at least two tables with the data associates with the one of the at least one columns.

17. The system as recited in claim 10 further comprising instructions for streaming the record into the at least two relational tables substantially in parallel.

* * * * *